J. Clark.
Piston Packing.
No. 103,140. Patented May 17, 1870.

Witnesses:
Victor Hagmann
C. A. Pettit

Inventor:
J. Clark
Munn & Co.
Attorneys.

United States Patent Office.

JOHN CLARK, OF HARRISBURG, PENNSYLVANIA.

Letters Patent No. 103,140, dated May 17, 1870.

IMPROVEMENT IN PISTON-PACKING.

The Schedule referred to in these Letters Patent and making part of the same.

*To all whom it may concern:*

Be it known that I, JOHN CLARK, of Harrisburg, in the county of Dauphin, and State of Pennsylvania, have invented a new and improved Piston Packing; and I do hereby declare that the following is a full, clear, and exact description of the same, reference being had to the accompanying drawings making a part of this specification, in which—

Figure 1:
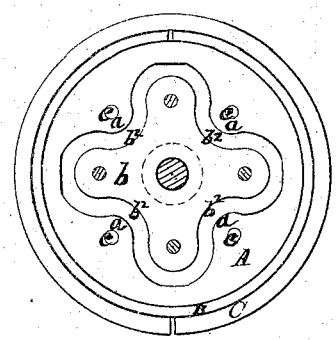
Figure 2:
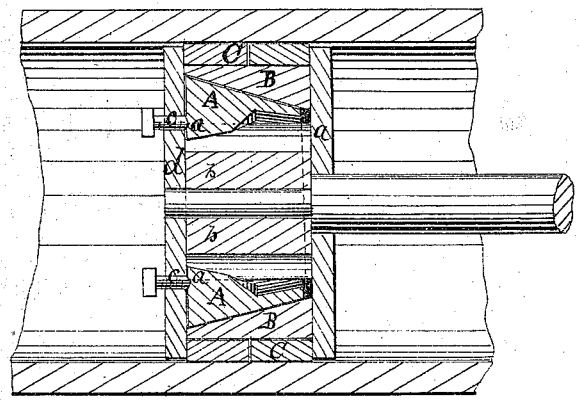

Figure 1 is a plan of the piston-head and packing, with the follower removed; and Figure 2 is a sectional elevation through the center.

The invention consists in the combination of an annular wedge placed outside of a block that projects from the center of a disk which forms the front face of a piston-head, with such disk, and with a parted ring having an inner transverse taper, and placed outside the annular wedge, and with an outer parted packing-ring, and with screws passing through the disk and bearing against the annular wedge in such manner that, by means of the screws, the wedge may be forced into the tapering ring so as to expand it and the outer packing-ring, until a steam-tight joint is formed between the piston and cylinder, the force with which the packing-ring bears against the interior of the cylinder being regulated by means of the screws according as the pressure of steam within the cylinder is greater or less.

In the drawings—

$a$ is the piston-head, from the center of which projects a block, $b$, which has four recesses, $b^2$, formed in its exterior, arranged equidistant.

A is an annular wedge placed outside the block $b$, and having four inward projections, $a$, which enter corresponding recesses, $b^2$, in the block $b$.

The office of the projections $a$ is to afford bearing-surfaces against which the set-screw $c$ may operate.

B is a ring with an inner transverse taper, and a cylindrical exterior which surrounds the wedge A, fitting it closely.

C C are two parted packing-rings that closely fit the outside of the ring B, and are themselves in contact with the interior of the cylinder. Hence, when the wedge A is forced into the ring B, the ring is expanded, and so, also, are the rings C C, and the piston is thus made to tighly fit the interior of the cylinder in which it travels.

The means by which the wedge A is forced into the ring B are screws, $c$, passed through the disk $d$ and bearing upon the projections $a$.

The disk $d$ is fastened securely to the block $b$ by means of screws, $e$, of which there are four.

On turning the screws $c$, the requisite pressure is brought to bear upon the wedge A, which pressure acts evenly on all parts of the inclosing rings, from the center outward.

I am aware that springs are in use for the purpose of pressing packing-rings against the interiors of cylinders by the interposition of an annular wedge, but there is an objection to this method of tightening, owing to the fact that springs act with an invariable force at all times, whereas, the force with which the packing-ring bears against the cylinder should vary according to the pressure of steam; the higher the latter, the greater is its tendency to pass the packing-ring from the plenum to the vacuum in the cylinder, and the stronger should be the pressure of the packing-ring to resist this tendency. My arrangement provides for this necessity, as by the screws $c$ the pressure of the packing-ring may be regulated at pleasure.

Having thus described my invention,

What I claim as new, and desire to secure by Letters Patent, is—

The combination of the packing-rings B C, annular wedge A, disk $d$, block $b$, and screws $c$, when all these parts are constructed and arranged to operate as described.

JOHN CLARK.

Witnesses:
SARAH CLARK,
WALLACE DEWITT.